Aug. 16, 1927.

W. S. WEBER ET AL 1,639,319

CANDY MIXING AND KNEADING MACHINE

Filed July 3, 1924   2 Sheets-Sheet 1

Inventors
Walter S. Weber
and Earl T. Snyder

By W.F.+D.M.Stewart

Attorneys

Aug. 16, 1927. 1,639,319
W. S. WEBER ET AL
CANDY MIXING AND KNEADING MACHINE
Filed July 3, 1924  2 Sheets-Sheet 2

Walter S. Weber
Earl T. Snyder
Inventors

Attorneys

Patented Aug. 16, 1927.

1,639,319

UNITED STATES PATENT OFFICE.

WALTER S. WEBER AND EARL T. SNYDER, OF READING, PENNSYLVANIA; SAID WALTER S. WEBER ASSIGNOR TO ROBERT CARL RAHM, OF WYOMISSING, PENNSYLVANIA.

CANDY MIXING AND KNEADING MACHINE.

Application filed July 3, 1924. Serial No. 723,900.

This invention relates to improvements in mixing or kneading mechanism, and more particularly to a novel machine to be used in mixing or kneading hard candy. This mixing and kneading, so far as we are informed, has heretofore been done by hand; two men working on opposite sides of a table, upon a slab batch of candy, turning over the edges with paddles and then flattening the mass again into a slab; this process properly working the candy for the molding machine and also thoroughly mixing in the desired coloring or flavoring materials.

The primary object of the present invention is to furnish a machine which will closely follow the hand method and will mix and knead the candy material in as thorough a manner as can be accomplished by hand.

Another object of the invention is to provide a machine of this character with opposite scraper blades manipulated in such manner as to lift the edge portions of the candy slab and to fold the same toward the center of the supporting table.

Another object is to furnish means whereby one blade may be set ahead of the other more or less, so one edge of the candy slab will be folded over the other at the center to permit a plunger to press upon the slab batch and spread a new surface over the table.

A still further object is to provide a machine of this type with a reciprocating and balanced plunger adapted to spread the candy after each folding operation.

Another object is to provide the machine with a conical projection arranged on the candy supporting table and cooperating with the plunger to spread the candy; said table being rotated step by step to present successive edge portions of the candy slab to the action of the scraper blades and plunger. The table is also water-jacketed to chill its surface and the surface of the candy, to prevent the latter from sticking to the table.

Other objects of the invention are to furnish novel mechanism for actuating the scraper paddles, so that these elements will positively dig first under the edge of the candy slab and then work inward with a folding over movement to fold in the edge towards the center of the table.

With the foregoing objects outlined and with other objects in view which will appear as the description proceeds, the invention consists in the novel features hereinafter described in detail, illustrated in the accompanying drawing, and more particularly pointed out in the appended claims.

Referring to the drawings.

Figure 1:
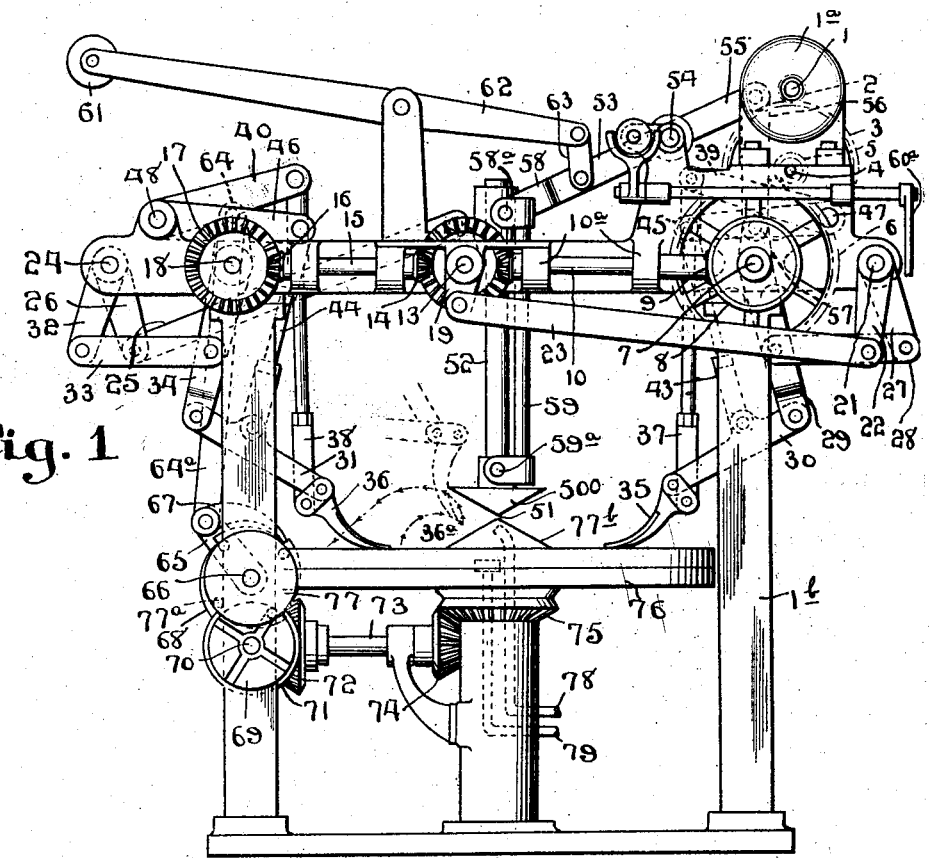
Figure 1 is a side view of the improved machine.
Figure 2:
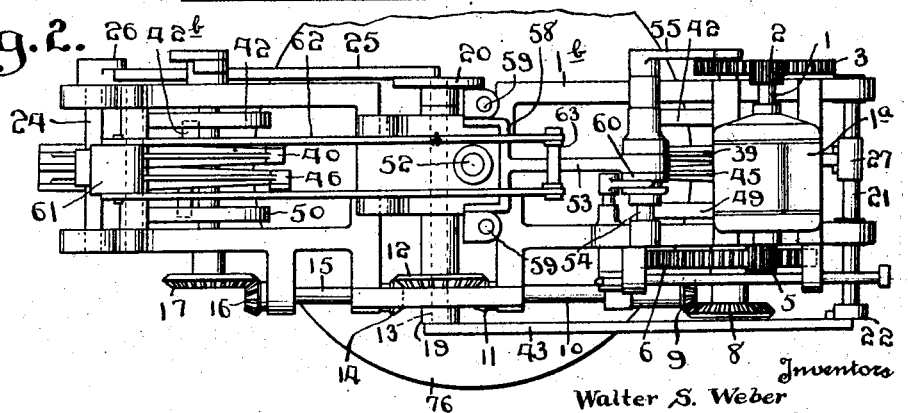
Fig. 2 is a top plan view of the same, with certain parts omitted for the purpose of clearness.
Figure 3:
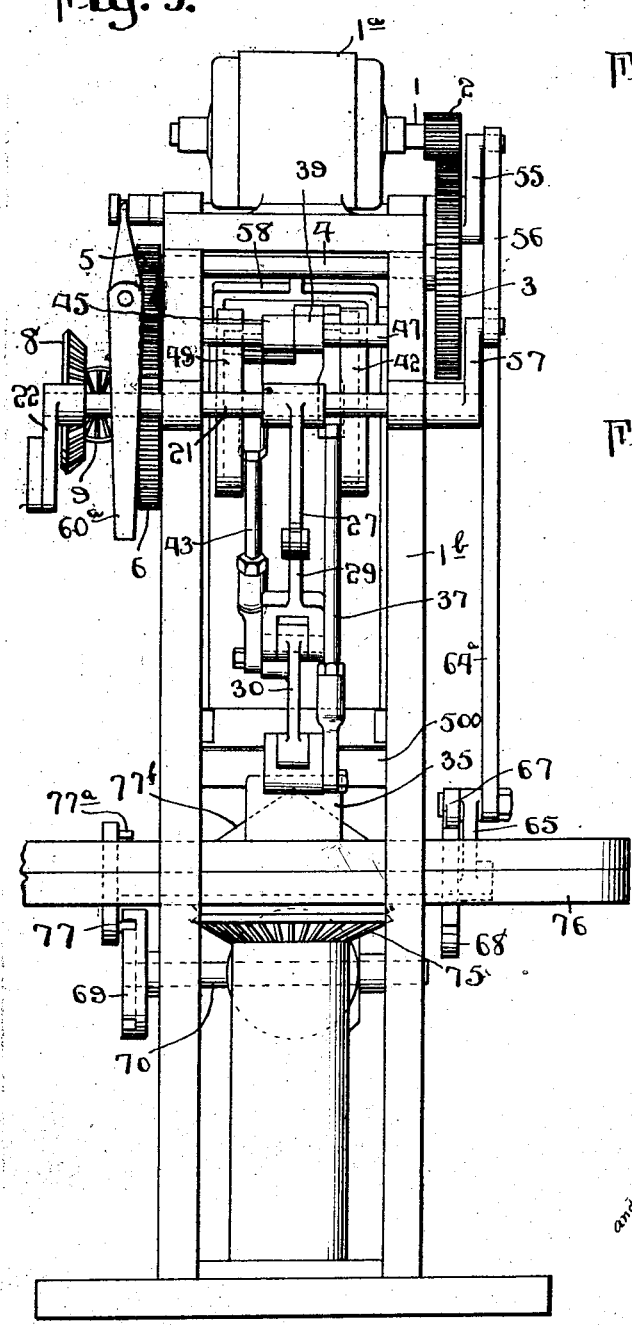
Fig. 3 is an enlarged end view, looking toward the left in Fig. 1.

In the drawing, 1 designates the drive shaft of the machine, which may be driven in any suitable manner, for instance by means of a built-in motor 1ª. This shaft has a fixed gear 2 driving a larger gear 3 fixed on one end of an idler shaft 4, that is rotatably mounted in suitable bearings in the frame 1ᵇ of the machine. The opposite end of this transversely extending shaft 4 carries a fixed small gear 5, which drives a larger gear 6 fixed on a shaft 7 rotatably mounted in suitable bearings in the frame 1ᵇ.

The shaft 7 may be called the main shaft, for it is from this shaft that the power is taken for driving various other elements of the machine. Therefore, this main shaft has at one end a fixed bevel gear 8 driving a similar pinion 9 on a longitudinally extending rotatable shaft 10 mounted in bearings 10ª on the machine frame. The shaft 10 carries a fixed bevel pinion 11 driving a bevel gear 12 fixed on a transverse center shaft 13, which is rotatably mounted in suitable bearings on the frame. The gear 12 drives a bevel pinion 14 arranged at one end of a shorter longitudinal shaft 15, which has a bevel gear 16 driving a similar gear 17 fixed on a rotatable shaft 18. Shafts 7 and 13 rotate in the same direction and shaft 18 in the opposite direction.

Shaft 13 carries a fixed crank 19 at one end and a similar crank 20 at its opposite end. Crank 19 operates right oscillating shaft 21 through crank 22 fixed thereto and connecting link 23 between cranks 19 and 22; and crank 20 similarly operates left hand oscillating shaft 24 through connecting link 25 and crank 26, the latter being fixed to shaft 24.

Figure 4:
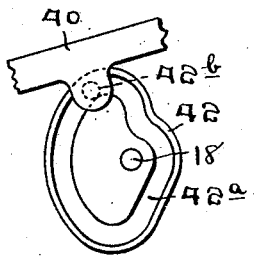
Fig. 4 is an elevation of one side of a cam employed in the machine.
Figure 5:
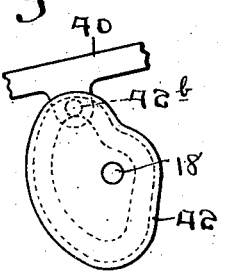
Fig. 5 is a similar view of the opposite side of the cam.

Shaft 21 carries a second fixed crank 27 connected by a link 28 to operating arm 29, which is loosely pivoted at its upper end on the shaft 7 and swings pivotally carried bar 30 from and toward the center of the slab table. Opposite left hand bar 31 is similarly swung from and toward the center of the slab table, by oscillating shaft 24 through crank 32, link 33 and operating arm 34, the latter having its upper end pivotally connected to the shaft 18. Bars 30 and 31 pivotally carry scraper paddles or blades, right designated 35 and left 36, and these are independently turned on their pivots to first scrape up the candy and then fold it over at the center (see arrow line 36$^a$) by respective links 37 and 38 connected to levers 39 and 40, which are pivotally mounted on shafts 47 and 48. Levers 39 and 40 are operated by box cams 42 fixed on the shafts 7 and 18. One of these cams is shown in detail in Figs. 4 and 5 and it will be observed that it has a track 42$^a$ to engage a roller 42$^b$, on the lever 39 or 40. Bars 30 and 31 are swung on their pivotal connections to operating arms 29 and 34, through links 43 and 44 connected to other levers 45 and 46 pivotally carried on the shafts 47 and 48, and are operated by cams 49 and 50, similar in shape to cams 42 and carried or fixed on shafts 7 and 18. The cams have been omitted from Fig. 1 for the purpose of clearness but they are clearly shown in the remaining figures and it is pointed out that their actions combined with the actions of the oscillating shafts 21 and 24 serve to swing the scrapers or paddles 35 and 36, in the manner indicated by the arrow line 36$^a$. The action is also such that one paddle moves slightly in advance of the other, so that it turns one edge of the candy slab over before the other paddle turns the opposite edge over.

The plunger 500 forming part of the construction, is preferably of rectangular shape in plan, but of wedge shape viewed from the side, so that its under surface is angled to a wedge line 51. The plunger has a guiding rod 52, which is reciprocated vertically with the plunger by means of a lever 53, keyed on a shaft 54, which rocks in suitable bearings on the frame of the machine. Lever 53 is rocked by a crank 55 fixed at one end on the shaft 54 and connected at its opposite end to a link 56, which in turn is connected to a crank 57 fixed on the shaft 7. One end of the lever 53 is forked, as shown at 58, and the tines of this fork are pivotally connected at 58$^a$ to supporting rods 59, which have their lower ends connected to the plunger rod at 59$^a$. The lever 53 is keyed to the shaft 54 by means of a clutch 60 having an operating handle 60$^a$. When this handle is actuated in the proper direction, it disconnects lever 53 from shaft 54, so that the shaft may rock without imparting any movement to the plunger 50, and under such circumstances, the plunger will remain stationary while a slab of candy is being placed on or removed from the table. To automatically raise the plunger at such times and to hold the same in raised position, the plunger is counterbalanced by a weight 61, connected to one end of a lever 62, which has its other end pivotally connected to a link 63 that is pinned to the lever 53.

Shaft 18 has a fixed crank 64, connected by a link 64$^a$ to a lever 65 loosely pivoted on shaft 66. A pawl 67 is pivotally mounted at the lower end of the lever 64$^a$ and works on the periphery of a four-toothed ratchet wheel 68 fixed to shaft 66. A pin toothed gear 77 is fixed on the shaft 66 and has its four teeth 77$^a$ arranged to drive a cross-slotted gear 69 fixed on the shaft 70, in the manner of a Geneva mechanism. The shaft 70 has a fixed bevel gear 71 driving a similar gear 72 on a shaft 73, which carries a fixed pinion 74 meshing with a bevel gear 75 on the under side of the rotatable table 76, which is moved step by step. The table has a prismatic conical central projection 77$^b$, and the whole table is hollow and cooled by water or the like entering pipe 78 and discharging through pipe 79.

As before stated, it is the purpose of this invention to provide mechanism intended to closely follow the hand method of mixing and kneading candy, and to accomplish this purpose, the material to be worked is placed upon the table 76, and then the machine operates as follows: From shaft 13, the rock shafts 21 and 24 receive their movement, and this movement is imparted to the operating arms 30 and 31 which move to and fro relatively to the axis of the table 76. At the commencement of the movement and for a short time after the movement is under way, the blades or paddles 35 scrape along the upper surface of the table, so as to lift the opposite edges of the candy slab and to cause these edge portions of the slab to ride upwardly on the upper surfaces of the blades 35 and 36. Then at a certain time in following order, the free edges of the blades, due to the movement of the links 37, 38, 43 and 44, will rise and move inwardly toward the center of the table, as illustrated in the lower portion of the arrow line 36$^a$. This will cause the opposite edge portions of the candy slab to be folded over upon one another, and then due to the action of the rock shafts 21 and 24, the blades 35 and 36 start their reverse movement, and in partaking of this reverse movement, the links 37, 38, 43 and 44 cause the free edges of the blades to move in paths, each of which is substantially similar to that shown in the upper portion of the dotted line 36ª, so that the blades then function as paddles and press upon the upper surface of the candy slab. Immediately after the blades have folded over the edge portions of the slab, the lever 53 is in such position as to bring the plunger 50 downwardly and this spreads the slab out, so that a new surface is presented. After the actuation of the plunger, the crank 64 moves in the proper direction to move the shaft 66 a quarter revolution and through the intervening mechanism, the table 76 is turned 90 degrees. Consequently, when the paddles 35 and 36 commence their next movement towards each other, they engage different edge portions of the slab from that acted upon on the previous movement, etc.

During the actuation of the various mechanism, a cooling medium is flowing by way of pipes 78 and 79 through the table 76, so that the candy is cooled and prevented from adhering to the table.

While we have disclosed the preferred embodiment of the invention in such manner that the construction, operation and advantages of the invention may be readily understood, we are aware that various changes may be made in the details set forth without departing from the spirit of the invention as expressed in the claims.

What we claim and desire to secure by Letters-Patent is:

1. A mixing and kneading machine including a supporting table, combined scraper and paddle blades cooperating with said table, means for moving said blades toward and away from each other, and vertically reciprocated means for spreading a blade-manipulated slab of plastic material out upon the table between the blades.

2. A mixing and kneading machine including a table adapted to support a slab of plastic material, blades movable over said table toward and away from each other, means for moving the blades toward each other while in contact with the table and to then lift the blades out of contact with the table during the remainder of the movement of the blades toward each other, and vertically reciprocated means for intermittently spreading out the blade-manipulated slab of material on the table.

3. In a mixing and kneading machine, a rotatable table adapted to support a slab of plastic material, combined scraping and paddling blades associated with the table and adapted to turn over the outer edges of the slab toward the center of the table, means for moving said blades toward and away from each other, and means for intermittently spreading out the centrally massed material upon the table.

4. A mixing and kneading machine including a table adapted to support a slab of plastic material, means for intermittently turning the table step by step, combined scraping and paddling blades operating over the table and adapted to fold edge portions of the slab towards the center of the table, means for moving said blades towards and away from each other, and means for intermittently pressing upon the blade-manipulated slab to flatten out the same upon the table.

5. A mixing and kneading machine including a table adapted to support a slab of plastic material, means for cooling the surface of the table to prevent said plastic material from adhering to the table, combined scraping and paddling blades operating over the table and adapted to fold edge portions of the slab toward the center of the table, means for moving said blades toward and away from the center of the table, and means for spreading out the slab on the table.

6. A machine for mixing and kneading materials, including a rotatable table provided with a central upwardly extending cone, combined scraping and paddling blades movable over the table and adapted to fold edge portions of material on the table toward the center of the latter, means for moving said blades toward and away from the center of the table, and a reciprocating plunger arranged above the table in substantial alignment with the axis of the cone and cooperating with the latter to spread material out on the table.

7. A mixing and kneading machine comprising a slab-supporting table, slab-manipulating blades movable on said table towards and away from the central portion thereof, and vertically reciprocated material-spreading means located above said central portion of the table.

8. A mixing and kneading machine including a table adapted to support a slab of plastic material, combined scraper and paddling blades operating on the table to fold edge portions of the slab, means for moving said blades towards and away from each other, a plunger arranged above the table and adapted to flatten out the slab, a guide rod for said plunger, supporting rods connected to the guide rod, a lever having a fork pivotally connected to the supporting rods, and means for oscillating said lever.

9. In a mixing and kneading machine, a reciprocating plunger, a guide rod for the plunger, supporting rods connected to the guide rod, a lever having a fork at one end pivotally connected to the supporting rods, a shaft passing through the opposite end of the lever, means for rocking said shaft, and manually controlled clutch mechanism for keying the lever on to said shaft.

10. In a mixing and kneading machine comprising a slab-supporting table and a slab-manipulating blade, a reciprocating plunger, a rocking lever operatively connected to said plunger, and a counter-balanced lever operatively connected to the first mentioned lever for normally moving the plunger upwardly.

11. In a mixing and kneading machine comprising a slab supporting table; a slab manipulating blade, a vertically reciprocated carrier pivotally connected thereto, and an oscillated operating arm cooperating with said movable carrier to impart a combined scraping-and-folding movement to the blade.

12. In a mixing and kneading machine comprising a slab supporting table; a slab manipulating blade, a movable carrier pivotally connected thereto, an oscillating arm also operatively connected to said blade, and separate operating means for said carrier and oscillating arm whereby a composite scraping-and-folding movement is imparted to the blade.

13. In a mixing and kneading machine comprising a slab supporting table; a slab manipulating blade, a movable carrier pivotally connected thereto, an oscillating arm also operatively connected to said blade, and separate operating means for said carrier and oscillating arm comprising a rotatable cam whereby the relative blade-actuating effects of the moving carrier and oscillating arm are determined.

14. A mixing and kneading machine including an intermittently rotated cooled table adapted to support a slab of plastic material and provided with an upwardly extending conical projection, oppositely disposed combined scraping and paddling blades movable over the table and functioning to fold the opposite edges of the slab toward the center of the table, means for moving the blades toward and away from each other and for swinging their adjacent edges upwardly while they are moving toward each other, and a plunger reciprocatingly mounted above the table and cooperating with the cone to flatten out the material resting on the table.

15. In a mixing and kneading machine comprising a slab-supporting table; a slab manipulating blade, and an operating mechanism therefor comprising a cam-actuated vertically reciprocating carrier and an oscillating arm both of which are operative upon the blade to impart thereto a combined scraping and folding movement.

In testimony whereof we affix our signatures.

WALTER S. WEBER.
EARL T. SNYDER.